(12) United States Patent
Schmidt

(10) Patent No.: US 8,741,248 B2
(45) Date of Patent: Jun. 3, 2014

(54) AMMONIA SALTS AS REGENERABLE $CO_2$ SORBENTS

(75) Inventor: Roland Schmidt, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 601 days.

(21) Appl. No.: 13/083,343

(22) Filed: Apr. 8, 2011

(65) Prior Publication Data

US 2011/0250121 A1 Oct. 13, 2011

Related U.S. Application Data

(60) Provisional application No. 61/323,404, filed on Apr. 13, 2010.

(51) Int. Cl.
- B01D 53/62 (2006.01)
- B01D 53/81 (2006.01)
- B01D 53/96 (2006.01)
- B01J 27/10 (2006.01)
- B01J 20/04 (2006.01)

(52) U.S. Cl.
USPC ........... 423/230; 423/220; 423/463; 502/224; 502/400

(58) Field of Classification Search
USPC ................... 423/210, 220, 230; 502/224, 400
See application file for complete search history.

(56) References Cited

U.S. PATENT DOCUMENTS

| | | | |
|---|---|---|---|
| 5,079,928 | A | 1/1992 | Rockenfeller et al. |
| 5,298,231 | A | 3/1994 | Rockenfeller |
| 5,876,488 | A | 3/1999 | Birbara et al. |
| 6,477,856 | B1 | 11/2002 | Khalili et al. |
| 6,547,854 | B1 | 4/2003 | Gray et al. |

FOREIGN PATENT DOCUMENTS

WO   WO 2007/094675   *   8/2007   ............. B01D 53/62

OTHER PUBLICATIONS

PCT Notification of Transmittal of the International Search Report and the Written Opinion of the International Searching Authority, or the Declaration, International Application No. PCT/US2011/031818, Apr. 8, 2011, 15 pages.

* cited by examiner

Primary Examiner — Stanley Silverman
Assistant Examiner — Daniel Berns
(74) Attorney, Agent, or Firm — Phillips 66 Company

(57) ABSTRACT

The present method describes the absorbing and desorbing of a gaseous reactant on a solid reactant. The solid reactant is an ammonia salt selected from the group consisting of alkali ammonium salts, alkali ammonium earth salts or a combination thereof.

2 Claims, 2 Drawing Sheets

US 8,741,248 B2

AMMONIA SALTS AS REGENERABLE $CO_2$ SORBENTS

CROSS-REFERENCE TO RELATED APPLICATIONS

This application is a non-provisional application which claims benefit under 35 USC §119(e) to U.S. Provisional Application Ser. No. 61/323,404 filed Apr. 13, 2010 entitled "AMMONIA SALTS AS REGENERABLE CO2 SORBENTS," which is incorporated herein in its entirety.

STATEMENT REGARDING FEDERALLY SPONSORED RESEARCH OR DEVELOPMENT

None

FIELD OF THE INVENTION

Method of using ammonia salts as regenerable $CO_2$ sorbents.

BACKGROUND OF THE INVENTION

The present invention relates generally to methods and apparatuses for capturing, sequestering, storing, disposing of, or entraining carbon dioxide ($CO_2$), such as is found in the air and the environment, as well as for mitigating carbon dioxide emissions. In some aspects of the invention, the $CO_2$ obtained by the methods and apparatuses is isolated and stored or disposed of to keep it from the air.

A serious environmental problem facing the world today is global climate change, i.e., global warming, which has been linked to the increased production of greenhouse gases, namely, carbon dioxide ($CO_2$). Growing evidence details the accumulation of greenhouse gases in the air, the most important of which is $CO_2$, as having an associated role in causing global climate warming. Since 2001, $CO_2$ accounted for over 82% of all greenhouse gas emissions in the United States. Nearly 60% of $CO_2$ is emitted by utility or industrial power systems, which are based on fossil fuel combustion. A continuing increase in the greenhouse gas $CO_2$ in the air highlights the need to develop cost effective, reliable and safe methods of $CO_2$ (or carbon) sequestration.

In order for carbon-rich fossil fuels, such as coal and natural gas, to remain viable and environmentally acceptable energy sources throughout the $21^{st}$ century and beyond, new technologies that employ capture and sequestration, utilization, or recycling of $CO_2$ need to be developed at reasonable costs. The sequestration of $CO_2$ would allow the use of carbon-based fuels to meet the world's increased energy demands far into the future, without further increasing the atmospheric concentration of $CO_2$. Additionally, for fossil fuels to maintain their predominance in the global energy market, the disposal of $CO_2$ and the elimination of $CO_2$ emissions to the air are ultimate goals for curbing the problem of global warming.

The present invention addresses the pervasive problems of the release and presence of excessive amounts of $CO_2$ in the air and provides solutions to these problems in the form of methods and apparatuses absorbing and desorbing $CO_2$. Advantageously, the present method can eliminate the energy penalty that can result from other implementations of mineral sequestration.

SUMMARY OF THE INVENTION

The present method describes the absorbing and desorbing of a gaseous reactant on a solid reactant. The solid reactant is an ammonia salt selected from the group consisting of alkali ammonium salts, alkali ammonium earth salts or a combination thereof.

The present method also describes absorbing and desorbing a gaseous reactant of $CO_2$ on a solid reactant. In this embodiment the solid reactant is an ammonia salt selected from the group consisting of $Li(NH_3)_6Cl$, $Mg(NH_3)_6Cl_2$ or a combinations thereof. The absorption percentage of the gaseous reactant upon the solid reactant is at least 20% more effective when compared to solid reactants absent ammonia.

In an alternate embodiment the method also describes absorbing $CO_2$ on a solid reactant to produce a sequestered carbon dioxide compound and desorbing $CO_2$ from the sequestered carbon dioxide compound. In this embodiment the solid reactant is an ammonia salt selected from the group consisting of: $Li(NH_3)_6Cl$, $Mg(NH_3)_6Cl_2$ or a combination thereof. In addition the absorption percentage of the gaseous reactant upon the solid reactant is at least 20% more effective when compared to solid reactants absent ammonia. Furthermore, a sequestered carbon dioxide compound is manufactured from the process of first combining $MgCl_2$ or $LiCl$ with $NH_3$ to produce the solid reactant of $Li(NH_3)_6Cl$ or $Mg(NH_3)_6Cl_2$ followed by absorbing $CO_2$ to the solid reactant to produce a sequestered carbon dioxide compound selected from the group consisting of: $Mg(NH_3)_{6-x}(CO_2)_xCl_2$, $Li(NH_3)_{6-x}(CO_2)_xCl$, $Mg(NH_3)_6Cl_2 x\ CO_2$, $Li(NH_3)_6Cl\ x\ CO_2$. The desorbing of the gaseous reactant on the solid reactant is an endothermic reaction which requires enough heat to release gaseous $CO_2$ from the sequestered carbon dioxide compound

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Figure 1:
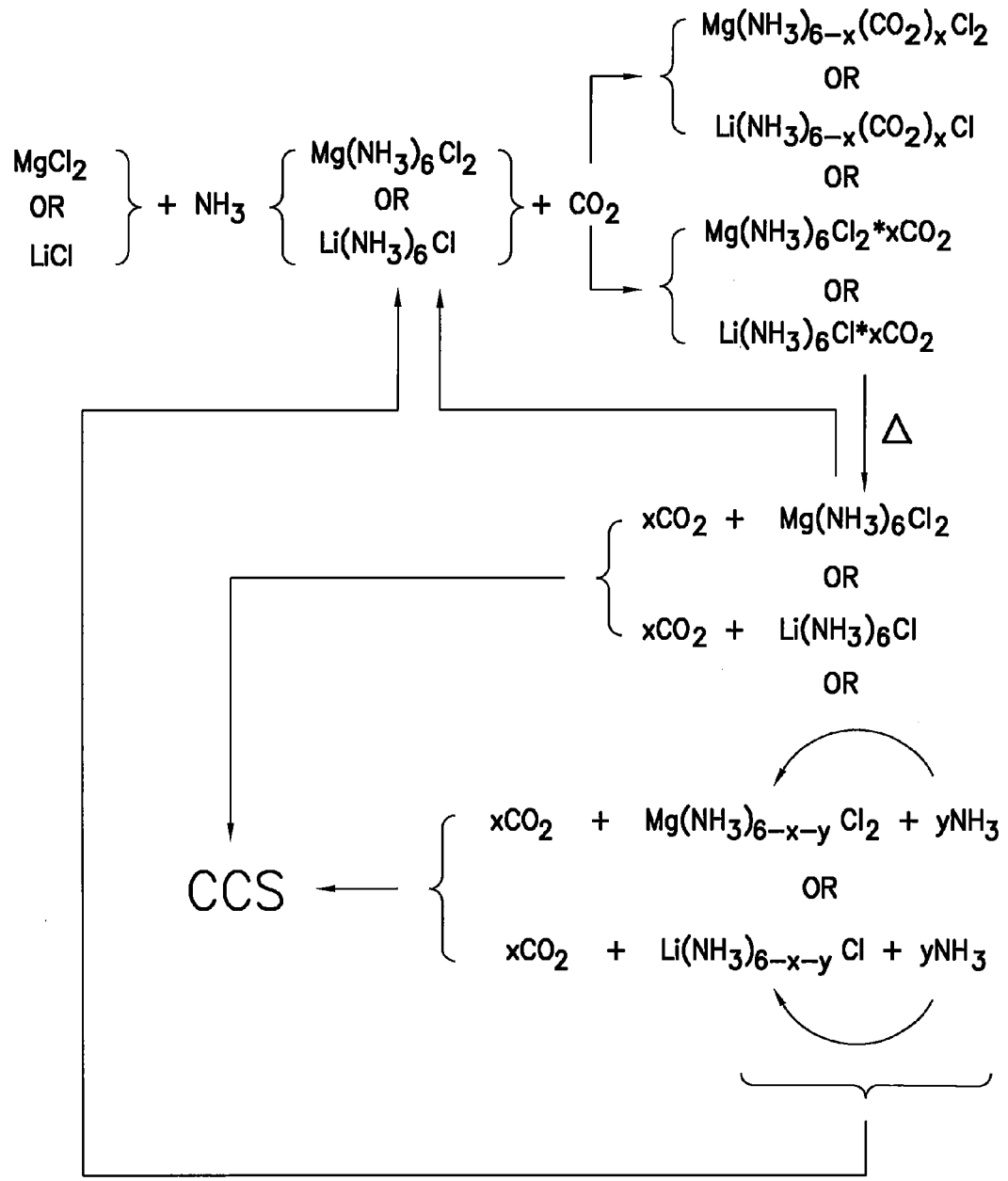
FIG. 1 depicts a chemical flow diagram of this method.

The present method absorbs and desorbs a gaseous reactant on a solid reactant. The solid reactant is an ammonia salt selected from the group consisting of alkali ammonium salts, alkali ammonium earth salts or a combination thereof.

In one embodiment the gaseous reactant is carbon dioxide ($CO_2$). The present embodiment generally relates to $CO_2$ extraction, reduction, capture, disposal, sequestration, or storage, particularly from the air, and involves new processes and apparatuses to reduce or eliminate $CO_2$, e.g., greenhouse $CO_2$, from the environment. Both air extraction and mineral sequestration of $CO_2$ are encompassed by the method. The methods described herein are aimed at effective and efficient carbon management, including cost effectiveness and efficient heat management resulting from the processes. Such processes and systems have been developed to extract or remove $CO_2$ from air, where, for example, the $CO_2$ concentration is approximately 0.037%. Thus, the methods of the embodiment provide useable and economically viable technologies for tackling and handling the escalating problem of global warming.

In one embodiment the solid reactant is an ammonia salt which is an alkali ammonium salt. The alkali ammonium salt can be a salt of any alkali group found in the periodic table. Examples of alkali ammonium salts include $M(NH_3)6Cl$ (M=group 1 metals or preferably Li, Na, and K). In a preferred embodiment the alkali ammonium salt is $Li(NH_3)_6Cl$.

In another embodiment the solid reactant is an ammonia salt which is an alkali ammonium earth salt. The alkali ammonium earth salt can be a salt of any alkali earth group found in the periodic table. Examples of alkali ammonium earth salts include M(NH$_3$)6Cl (M= group 2 metals or preferably Mg and Ca). In a preferred embodiment the alkali ammonium earth salt is Mg(NH$_3$)$_6$Cl$_2$.

In one embodiment the solid reactant can be placed on any typical catalytic bed. Types of catalytic beds include fixed and fluidized beds In one embodiment the desorbing of the gaseous reactant on the solid reactant is an endothermic reaction requiring enough heat to release gaseous $CO_2$ from a sequestered carbon dioxide compound. This amount of heat can be applied to the reaction by a variety of means such as thermal heating.

In another embodiment, a cryogenic pressure system is embraced to perform the $CO_2$ absorbing and desorbing of the current method. In accordance with this embodiment, the $CO_2$-saturated ammonia salt material is packed into a first chamber at room temperature that can be evacuated. The first chamber can be connected to a low-grade vacuum system that removes remnant air that is caught in or on the ammonia salt material. After a pressure reduction in the first chamber from atmospheric pressure to near vacuum pressure, $CO_2$ is allowed to flow from the ammonia salt into a second chamber where the $CO_2$ condenses onto cold surfaces (e.g., solid substrates) as solid carbon dioxide. $CO_2$ flow can be controlled by the opening of a valve or another means that achieves the desired result. The pressure in the second chamber is lower than the vapor pressure of $CO_2$ in the first chamber, and can depend upon the type of absorbent material that is utilized in the second chamber. At sufficiently low temperature, any surface material is suitable for the purpose of this method.

Illustratively, the pressure of the second chamber can be about 100 ppm of an atmosphere, or about 0.001 psi. The temperature in this second chamber is low enough for the $CO_2$ to condense out, e.g., in the form of dry ice. Accordingly, the temperature is about −80° C. or −100° C. or lower. Liquefied air may be used as a coolant. Without wishing to be bound by theory, because the temperature in the second chamber is below the freezing point of $CO_2$, the equilibrium partial pressure of $CO_2$ in the second chamber is far lower than the pressure of $CO_2$ over the saturated (warmer) $CO_2$ sorbent surfaces in the first chamber. As a consequence, the system establishes a pressure gradient between the two chambers and the $CO_2$ travels from the chamber having higher pressure to the chamber having lower pressure chamber until enough $CO_2$ has been removed from the sorbent so that the partial pressure in the first sorbent chamber has dropped as well. When a substantial amount of carbon dioxide has formed as dry ice on the solid surface(s), which serve as a "cold trap" within the second chamber, the collected dry ice is confined to a small volume and brought to ambient temperature. As the dry ice warms up, it turns into $CO_2$ gas, which, as it is confined to a small volume, will be produced at a high pressure. This gas is then released under pressure from the cryogenic system, e.g., into containment vessels and the like, for further storage or collection.

In this embodiment, the partial pressure of $CO_2$ is reduced over the system to the point that a substantial fraction of the adsorbed $CO_2$ is released and captured in the cold trap. The dry ice that forms in the cold trap is collected over time, e.g., from about 15 minutes to several hours, or from about 20 minutes to one hour. For example, the rate of heat transfer between the cold trap and the solid sorbent in the second chamber can be as fast as about 50 g/m$^2$/sec. Thus, a system containing 1 ton of sorbent containing about 50 kg of $CO_2$ could release its $CO_2$ as dry ice in about 20 minutes. When sufficient amounts of dry ice are available, the dry ice is confined to a small volume, e.g., by scraping it from the cold trap and moving it to a suitably sized vessel. The size of the vessel is such that when the solid $CO_2$ is allowed to warm or heat to ambient conditions, it is then at the desired pressure. The $CO_2$ is then released under pressure, e.g., about 60 to about 200 bar pressure, to a suitable or desired $CO_2$ containment vessel, or handling, storage, or transportation system. Advantageously, such a vacuum system effectively requires no pumps to pressurize gaseous $CO_2$. By keeping the $CO_2$ confined, pressure is obtained from the energy input that was provided in the refrigeration system that maintained a low temperature in the cold trap.

In related embodiments, the present invention provides systems and apparatuses for extracting, capturing, or entraining $CO_2$ from the air or wind. Such capture apparatuses can include a wind capture system or a cooling-type tower for extracting, sequestering, or capturing $CO_2$ as further described herein. Fan driven systems are encompassed. Wind capture systems refer to freestanding objects similar in scale to a wind energy turbine. For example, such devices contain a pivot that ensures that contacting surface can follow the wind directions. A solid system contains moving components on which one or more solid sorbent is bound. These components are mechanically raised into the wind so as to absorb $CO_2$. Once saturated, the components are removed from the wind stream, isolated and stripped of $CO_2$. In another embodiment, a cooling tower contains a $CO_2$ removal zone in the air inlet at the base, which may contain either solid or liquid sorbents in a manner described above.

In another embodiment, a $CO_2$ capture system according to this invention can comprise filter systems wetted by a flow of sodium hydroxide that readily absorbs $CO_2$ from the air, and in the process, converts it to sodium carbonate. Without wishing to be bound by theory, if the pressure drop across the system due to viscous drag is comparable to the kinetic energy density in the air, then the fraction of $CO_2$ removed from the flow stream becomes significant, so long as the sorbent materials are strong absorbers. This is because the momentum transfer to the wall follows essentially the same physical laws of diffusion as the carbon dioxide transfer. In a cooling tower type of system, intake air is pulled through a filter system that is continuously wetted with sodium hydroxide. Another type of system can involve a slight pressure drop generated by other means. In yet another system, air contacts sorbent surfaces simply by the wind (or moving air) passing through the device or system. It will be appreciated that in the design of a contact system, the rate of absorption should be considered. In this regard, the volume of sorbent per unit output of $CO_2$ is independent of the specific details of the air contacting design.

Advantageously, air extraction of $CO_2$ and systems for this purpose can be modified based on site-specific conditions, which can include temperature, wind, renewable energy potential, proximity to natural gas, proximity to sequestration site(s) and proximity to enhanced oil recovery site(s). The system should be designed for ease of relocation. For example, the extractor may be sited at an oil field in order to minimize transport. In such a case, oil could be reformed and used in the calcination system.

In other embodiments, chemical processes, e.g., calcinations and calcining carbonate, are encompassed for the recovery of $CO_2$. One process involves oxygen blown calcinations of limestone with internal $CO_2$ capture. Such calcinations are carried out in a calcining furnace that uses oxygen rather than air. The use of oxygen results in the product stream including only $CO_2$ and $H_2O$, which can be easily separated. In addition, power plant and air capture sorbent recovery can be integrated into one facility. Another process involves electrically heated calcinations. Yet another process involves solid oxide ionic membranes and solid oxide fuel cell-based separation processes. Another chemical process involves the electrochemical separation of $CO_2$ from $Na_2CO_3$, for example, using a three-chamber electrolytic cell containing one cationic membrane and an anionic membrane. The cationic membrane is located between the central cell and the negative electrode while the anionic membrane is located between the center and the cathode. A current is applied to the cell and then sodium carbonate is introduced into the center cell. The ions move toward the opposite electrode. Hydrogen is evolved at the anode and oxygen gas is evolved at the cathode, resulting in the formation of NaOH at the anode and carbon dioxide gas at the cathode. Several cells can be stacked together by placing a bipolar membrane at the electrode locations of the single cell. This serves to reduce the amount of gas evolved per unit reagent regenerated.

In another embodiment, the present invention relates to methods of transitioning from today's energy system comprising unsequestered $CO_2$ resulting from the use of fossil fuels to the capture and disposal of $CO_2$, and ultimately, to renewable energy with recycling of $CO_2$. Such transitioning methods comprise combining $CO_2$ capture with magnesium silicate disposal. In this embodiment, $CO_2$ can be removed from the air, but rather than disposing of the removed $CO_2$, it is used as a feedstock for making new fuel. The energy for the fuel derives from a renewable energy source or any other suitable source of energy that does not involve fossil fuels, such as hydroelectricity, nuclear energy. For example, $CO_2$ is initially collected and disposed of or sequestered in underground deposits (such as in enhanced oil recovery,) or in mineral sequestration. In this way, the source of the energy is fossil fuel that can be extracted from the ground. To maintain an environmentally acceptable material balance, the carbon must be re-sequestered or disposed of. Alternatively, carbon can be recycled as an energy carrier. Hydrocarbon, i.e., reduced carbon, contains energy that is removed by the consumer by oxidizing the carbon and the hydrogen, resulting in $CO_2$ and water. The capture of $CO_2$ from air allows the $CO_2$ to be recovered; thereafter, renewable energy can be used to convert the $CO_2$ (and water) back into a new hydrocarbon. The production of hydrocarbon can include a number of processes. Illustratively, Fischer Tropsch reactions are conventionally used to convert carbon monoxide and hydrogen to liquid fuels, such as diesel and gasoline (e.g., Horvath I. T., Encyclopedia of Catalysis, Vol. 2, Wiley Interscience, p. 42). Similar methods using $CO_2$ and hydrogen are also established. Hydrocarbon can be produced from $CO_2$ and hydrogen. Hydrocarbon production typically involves the use of energy, e.g., electric energy, to convert water into hydrogen and oxygen, or $CO_2$ into CO and oxygen. Thereafter, fuels such as methanol, diesel, gasoline, dimethylether (DME), etc. can be made.

In other embodiments of this invention, $CO_2$ capture apparatuses and systems are encompassed, especially for use in connection with the described processes. In one embodiment, a wind capture system comprises a $CO_2$ capture apparatus in which the air delivery system relies on natural wind flow. Such a $CO_2$ capture apparatus can be situated in the same or similar areas to those in which wind turbines are employed. In another embodiment, the invention embraces a water spray tower $CO_2$ capture apparatus comprising a cylindrical tower, e.g., approximately 100 feet in height, which is open to the air at its top and contains ground level exit vents. A vertical pipe comprises the center of the tower through which water can be pumped; the pipe can be capped with a nozzle that sprays water horizontally. Water is pumped to the top and sprayed into the air. The resultant evaporation creates a pocket of air that is colder and denser than the air below it. This leads to a down draft which forces air through the exit vents. The exit vents contain a solid or liquid sorbent for $CO_2$ capture. In another embodiment, the invention embraces an air convection tower CO2 capture apparatus comprising a vertical cylindrical tower that is attached to a glass skirt situated approximately 1 foot above the ground level. The glass insulates the air between the ground and itself, which raises the air temperature. The hot air then exits through the central tower. A solid or liquid $CO_2$ capture device is contained in the tower. In another embodiment, the invention encompasses a $CO_2$ capture apparatus comprising a glass covered slope, which comprises a glass sheet situated some distance above ground level, e.g., between 0.3 m and 30 m, depending on the size of the overall apparatus. The glass acts as an insulator that causes the air to heat in the sunshine and this results in a draft up the hill. The resulting flow is guided over $CO_2$ absorber surfaces, which removes $CO_2$ from the air passing through it. In another embodiment, the invention encompasses cooling towers to replace a conventional water cooling liquid with a liquid sorbent. The liquid sorbent evaporates water; in addition, the liquid sorbent collects $CO_2$ in concentrated form. In all cases, the saturated sorbent is stripped of its $CO_2$ as described herein.

In another embodiment, wind funneling devices are optimized for throughput rather than air speed, thereby leading to optimization for $CO_2$ capture and sequestration. For example, air convection towers employed for $CO_2$ capture can be shorter than towers designed for electricity production, since increased height to promote air speed is not a requisite for $CO_2$ sequestration. Further, in such $CO_2$ capture apparatuses, textile membranes are used to separate alkaline fluids from the open air. Such membranes comprise cloth-type fabrics that allow air passage while limiting sorbent loss through spray. An illustrative, yet nonlimiting, fabric is Amoco 2019. Other $CO_2$ capture systems include those that are adapted to wind flow, e.g., venturi flows that create suction on a set of filters that are balanced by adjusting the size of the openings so as to maintain constant flow speed through the filtration system.

FIG. 1 depicts a figure of the typical chemical flow diagram of this method. In this figure the absorbing of the gaseous reactant $CO_2$ begins with the manufacture of the solid reactant. $MgCl_2$ or LiCl is combined with NH3 to produce an ammonia salt solid reactant of either $Li(NH_3)_6Cl$ or $Mg(NH_3)_6Cl_2$. $CO_2$ is then added to the solid reactant to produce an absorbed carbon dioxide compound selected from the group consisting of: $Mg(NH_3)_{6-x}(CO_2)_xCl_2$, $Li(NH_3)_{6-x}(CO_2)_xCl$, $Mg(NH_3)_6Cl_2 \times CO_2$, $Li(NH_3)_6Cl \times CO_2$. The flow of $CO_2$ over the solid reactant occurs over several minutes to several hours at various gas hourly space velocities from 0.1-1000000. The quality of the $CO_2$ can range from diluted to pure streams.

The desorbtion of the $CO_2$ begins with adding heat to the sequestered carbon dioxide compound. The amount of heat added would be enough to release gaseous $CO_2$ from a sequestered carbon dioxide compound. The heat can be applied to the adsorbed carbon dioxide compound b a variety of means such as thermal heating. After applying heat $CO_2$ is released from the absorbed carbon dioxide compound for carbon. capture and storage ("CCS").

Figure 2:
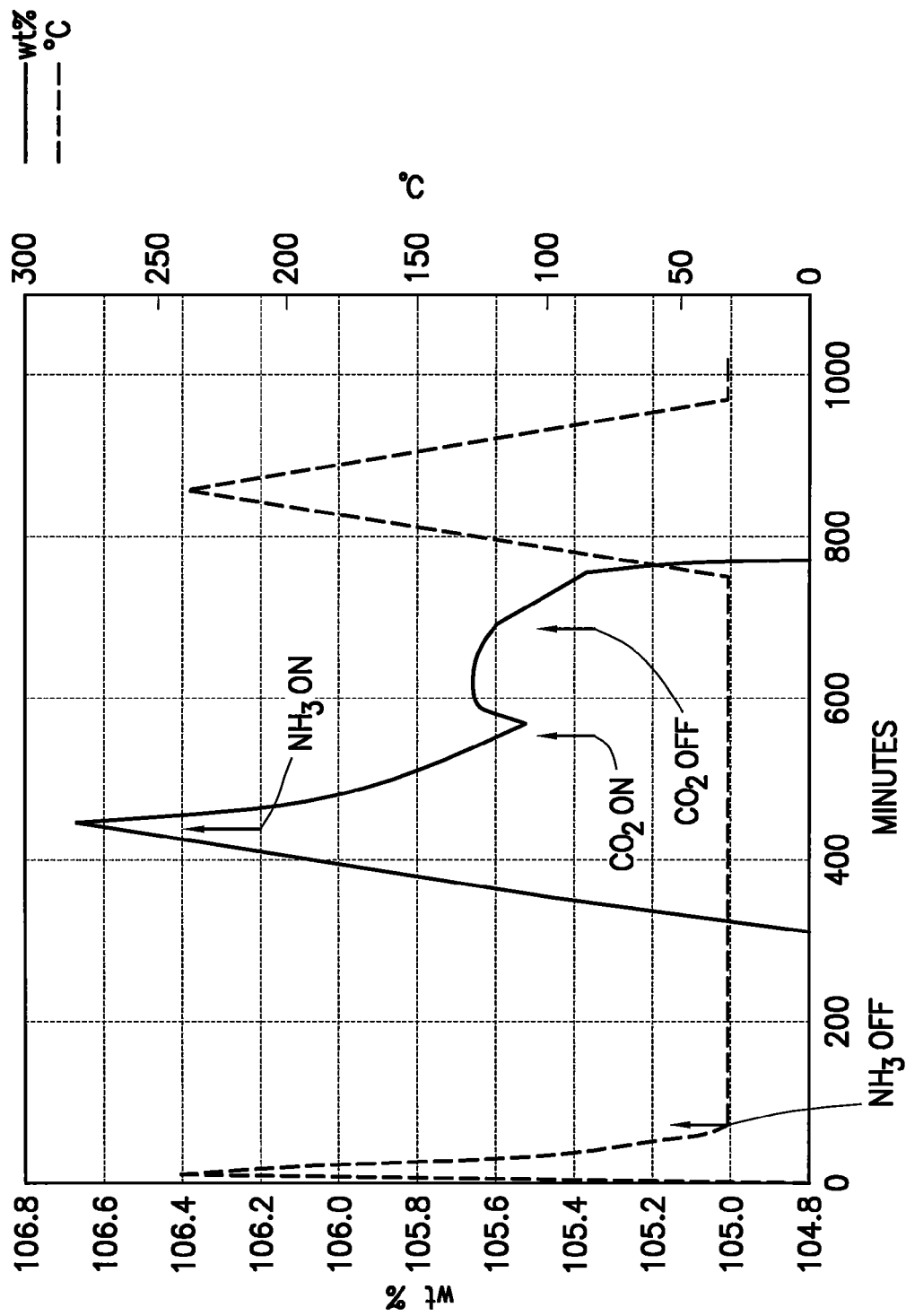
FIG. 2 depicts a comparative graph showing that the addition of $NH_3$ causes an increase in $CO_2$ absorption.

FIG. 2 depicts a comparative graph showing that the addition of $NH_3$ causes an increase in $CO_2$ absorption. In this experiment salt was exposed to ammonia to form ammonium salt. Once the ammonium salt was loaded, $CO_2$ was introduced and an increase of $CO_2$ uptake compared to regular salt was observed.

The uptake of $CO_2$ was observed on via thermal gravimetric analysis. Thermal gravimetric analysis is typically done on samples to determine changes in weight in ration to change in temperature.

In FIG. 2 the arrows correspond to $NH_3$ on, $NH_3$ off, $CO_2$ on and $CO_2$ off. When pure $MgCl_2$ salt was exposed to $CO_2$ a weight gain of 0.14% was measured. When $NH_3$ was added to $MgCl_2$ a weight gain of 0.2% was measured. The overall $CO_2$ uptake was increased by ~43% when $NH_3$ is added to the salt.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising:

absorbing and desorbing $CO_2$ on a solid reactant wherein the solid reactant is $Li(NH_3)_6Cl$, wherein the absorption percentage of the gaseous reactant upon the solid reactant is at least 20% more effective when compared to solid reactants absent ammonia, 2. A method comprising:

absorbing $CO_2$ on a solid reactant to produce a sequestered carbon dioxide compound and desorbing $CO_2$ from the sequestered carbon dioxide compound wherein the solid reactant is $Li(NH_3)_6Cl$, wherein the absorption percentage of the gaseous reactant upon the solid reactant is at least 20% more effective when compared to solid reactants absent ammonia, wherein, a sequestered carbon dioxide compound is manufactured from the process of combining LiCl with $NH_3$ to produce the solid reactant of $Li(NH_3)_6Cl$; and absorbing $CO_2$ to the solid reactant to produce a sequestered carbon dioxide compound selected from the group consisting of: $Li(NH_3)_{6-x}(CO_2)_xCl$ and, $Li(NH_3)_6Cl \times CO_2$, and wherein the desorbing of the gaseous reactant on the solid reactant is an endothermic reaction requiring enough heat to release gaseous $CO_2$ from the sequestered carbon dioxide compound.

* * * * *